(12) United States Patent
Veilleux, Jr. et al.

(10) Patent No.: US 9,982,606 B2
(45) Date of Patent: May 29, 2018

(54) ELECTRIC ARCHITECTURE WITH POWER STORAGE CELLS

(71) Applicant: Goodrich Corporation, Charlotte, NC (US)

(72) Inventors: Leo J. Veilleux, Jr., Wethersfield, CT (US); Lubomir A. Ribarov, West Hartford, CT (US)

(73) Assignee: Goodrich Corporation, Charlotte, NC (US)

( * ) Notice: Subject to any disclaimer, the term of this patent is extended or adjusted under 35 U.S.C. 154(b) by 360 days.

(21) Appl. No.: 14/503,740

(22) Filed: Oct. 1, 2014

(65) Prior Publication Data
US 2016/0096632 A1    Apr. 7, 2016

(51) Int. Cl.
| | |
|---|---|
| *F02C 7/32* | (2006.01) |
| *H02J 4/00* | (2006.01) |
| *F01D 15/10* | (2006.01) |
| *B64D 41/00* | (2006.01) |

(52) U.S. Cl.
CPC ............... *F02C 7/32* (2013.01); *F01D 15/10* (2013.01); *H02J 4/00* (2013.01); *B64D 41/00* (2013.01); *B64D 2221/00* (2013.01); *F05D 2220/76* (2013.01); *F05D 2260/42* (2013.01); *F05D 2260/96* (2013.01)

(58) Field of Classification Search
CPC ...... F02C 7/32; F02C 6/14; F02C 7/24; F01D 15/10; F01D 25/24; H02J 4/00; H02J 1/06; F05D 2220/76; F05D 2260/42; F05D 2260/96; H01M 10/4264; B64D 27/10; B64D 29/00; B64D 2033/0206; B64D 41/00; B64D 2221/00
See application file for complete search history.

(56) References Cited

U.S. PATENT DOCUMENTS

| | | |
|---|---|---|
| 5,850,113 A | 12/1998 | Weimer et al. |
| 6,169,389 B1 | 1/2001 | Chen |
| 6,487,059 B2 | 11/2002 | Bontempo et al. |
| 7,015,674 B2 | 3/2006 | VonderHaar |
| 7,075,273 B2 | 7/2006 | O'Gorman et al. |
| 7,095,357 B1 | 8/2006 | Johler |
| 7,109,686 B2 | 9/2006 | Schulte et al. |
| 7,117,044 B2 | 10/2006 | Kocher et al. |
| 7,143,298 B2 | 11/2006 | Wells et al. |

(Continued)

FOREIGN PATENT DOCUMENTS

| | | |
|---|---|---|
| EP | 1947008 A1 | 7/2008 |
| EP | 2658081 A2 | 10/2013 |

(Continued)

OTHER PUBLICATIONS

Great Britain Search Report for Great Britain Application No. 1517289.3 completed Feb. 12, 2016.

*Primary Examiner* — Ryan Johnson
(74) *Attorney, Agent, or Firm* — Carlson, Gaskey & Olds, P.C.

(57) ABSTRACT

An architecture for providing power to an aircraft comprises a power supply. The power supply provides power to a plurality of components. An array has a plurality of storage cells. The plurality of storage cells includes capacitors which are charged by the power supply, and which selectively provide power to the components. The array is mounted on a fan case. An engine is also disclosed.

15 Claims, 4 Drawing Sheets

(56) References Cited

U.S. PATENT DOCUMENTS

| | | | |
|---|---|---|---|
| 7,309,974 B2 * | 12/2007 | Sarlioglu | ................ F01D 15/10 |
| | | | 290/4 D |
| 7,781,818 B2 | 8/2010 | Manning et al. | |
| 7,786,620 B2 | 8/2010 | Vuk et al. | |
| 8,133,089 B2 | 3/2012 | Amireh et al. | |
| 8,519,463 B2 | 8/2013 | Manning et al. | |
| 8,795,544 B2 | 8/2014 | Ito et al. | |
| 2015/0249362 A1 * | 9/2015 | Bridgelall | ................ H02J 7/345 |
| | | | 307/9.1 |

FOREIGN PATENT DOCUMENTS

| | | |
|---|---|---|
| WO | 2010067172 A2 | 6/2010 |
| WO | 2011072366 A1 | 6/2011 |

* cited by examiner

ELECTRIC ARCHITECTURE WITH POWER STORAGE CELLS

BACKGROUND OF THE INVENTION

This application relates to a system for powering components associated with an aircraft.

Gas turbine engines on an aircraft are being provided with increasing amounts of electrical components. It becomes important to efficiently and adequately control and power those components.

Typically, a gas turbine engine includes a number of actuators for actuating systems, such as nozzles, etc., pumps for moving fluids, such as a fuel pump or an oil pump, and controls, such as a full authority digital engine control ("FADEC") or an electronic engine control ("EEC").

Further, during different times of operation of the engine and an associated aircraft, there are transients. As one example, the known systems have power surge transients, such as during take-off of an associated aircraft.

The systems for powering the aircraft need to be provided large enough to provide adequate power instantaneously during those power surge conditions.

In addition, there may be short term failures associated with the system.

Historically, the gas turbine engine has been provided with an electric generator that provides power to a bus associated with the aircraft.

SUMMARY OF THE INVENTION

An architecture for providing power to an aircraft comprises a power supply. The power supply provides power to a plurality of components. An array has a plurality of storage cells. The plurality of storage cells includes capacitors which are charged by the power supply, and which selectively provide power to the components. The array is mounted on a fan case. An engine is also disclosed.

These and other features may be best understood from the following drawings and specification.

DETAILED DESCRIPTION

Figure 1:
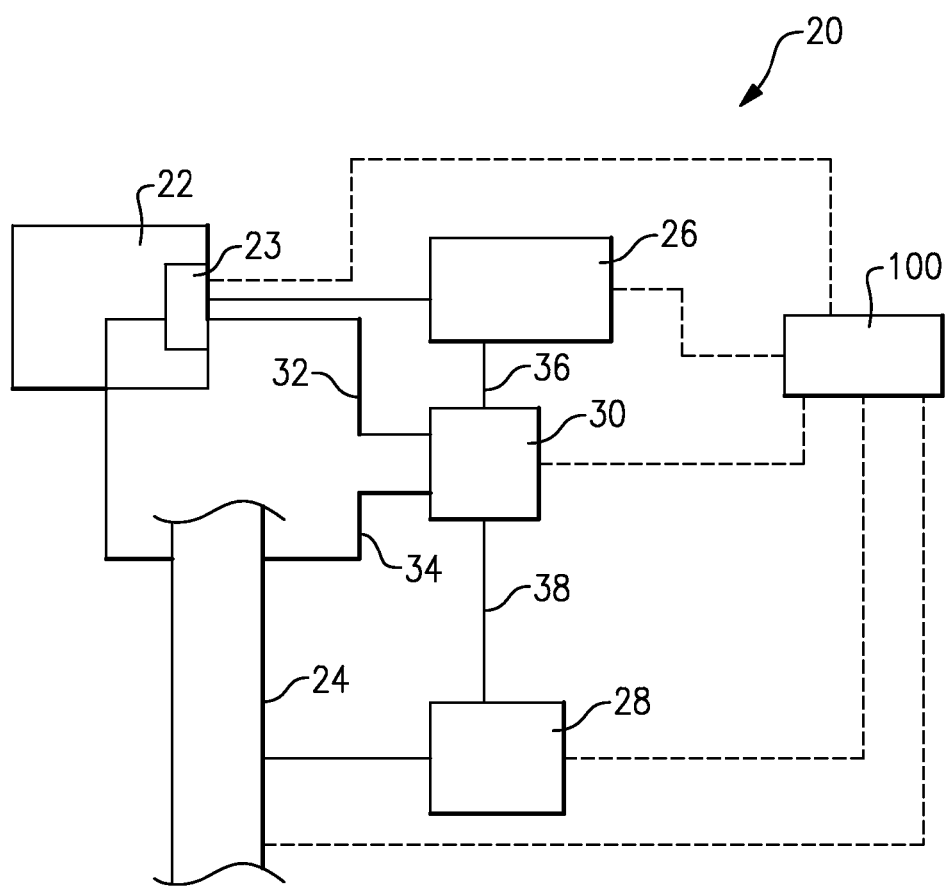
FIG. 1 schematically shows an aircraft power system.

FIG. 1 shows an aircraft 20 and its associated power system schematically. A gas turbine engine 22 drives a generator 23, as known. The generator provides power to an associated bus 24, which drives components associated with the aircraft 20.

In the schematic of FIG. 1, a first component 26 and a second component 28 are shown. The first component 26 is shown being driven directly from the generator 23, whereas the component 28 is obtaining power from the bus 24. As known, in practice, there may be many other concepts powered by generator 23 and bus 24.

As mentioned above, these components may be actuators for moving elements, pumps, controls, or other associated systems. The components may have short-term need for peak power, which must be obtained relatively instantaneously. As an example, a fuel pump must deliver very high levels of fuel at take-off, but generally delivers lower levels. All of the power components must be designed and provided sufficiently large to meet these high demands, even though they are only occurring over a small portion of the operational life of the system.

In addition, it is well known that there can be short-term glitches, such as gaps between pulses from the power supply.

Thus, a capacitor array 30 is provided, which is powered and stores power, to supply power back to the components 26 and 28.

As shown in FIG. 1, generator 23 is providing power at 32 to the capacitor array 30. Similarly, bus 24 is providing power at 34 to the capacitor array 30. The capacitor array 30 is, in turn, shown providing power at 36 and 38 back to components 26 and 28, respectively.

A control 100 is shown schematically controlling the capacitor array 30, generator 23, components 26 and 28, and the bus 24.

Thus, the capacitor array 30 may provide additional power to the components 26 and 28, if it were in need of short-term additional power to supplement that supplied by the generator 23 or bus 24. Further, the capacitor array 30 can serve to overcome short-term failures in the power supply system or to smooth gaps between DC pulses. Further, should the power supply to a component fail, the capacitor array 30 may power that component, at least until the main power can be restored. As should be recognized, there are critical devices associated with a gas turbine engine 22 and aircraft 20. As an example, fuel or oil pumps are critical to continued operation and, thus, would benefit from having the power supplied by the capacitor array 30.

Figure 2:
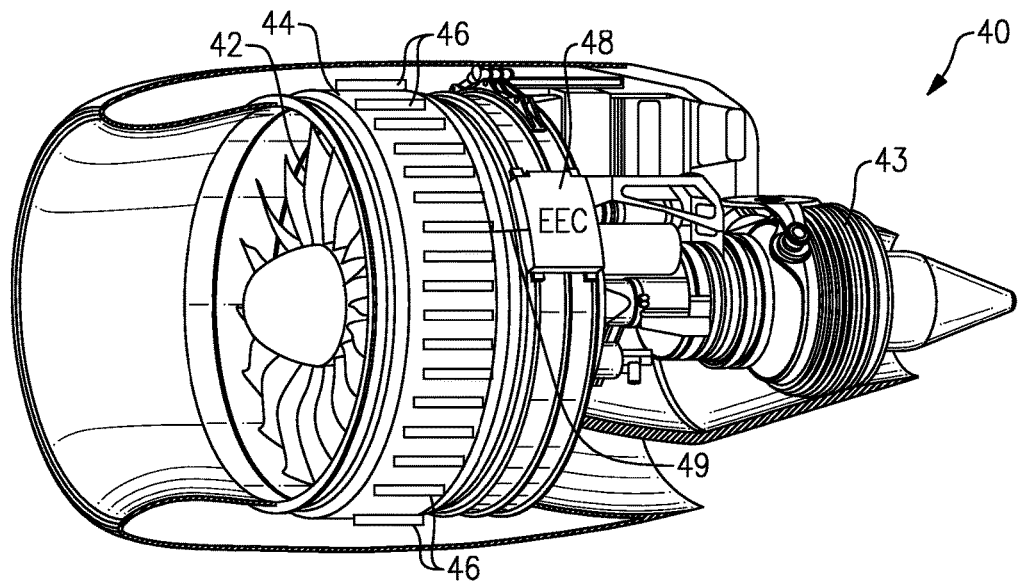
FIG. 2 shows a first embodiment.

A challenge is finding a location to store the capacitor array 30. Thus, as shown in FIG. 2, a fan 42 has a fan case 44 in a gas turbine engine 40. Other areas 43 of the engine would be very hot compared to the fan case 44. As shown, the capacitor array includes a plurality of circumferentially spaced capacitors 46. At 49, one is shown providing supplemental power to an EEC 48 for the engine 40. Of course, other components may be powered by the array of capacitors 46, as illustrated generally in FIG. 1.

Figure 3:
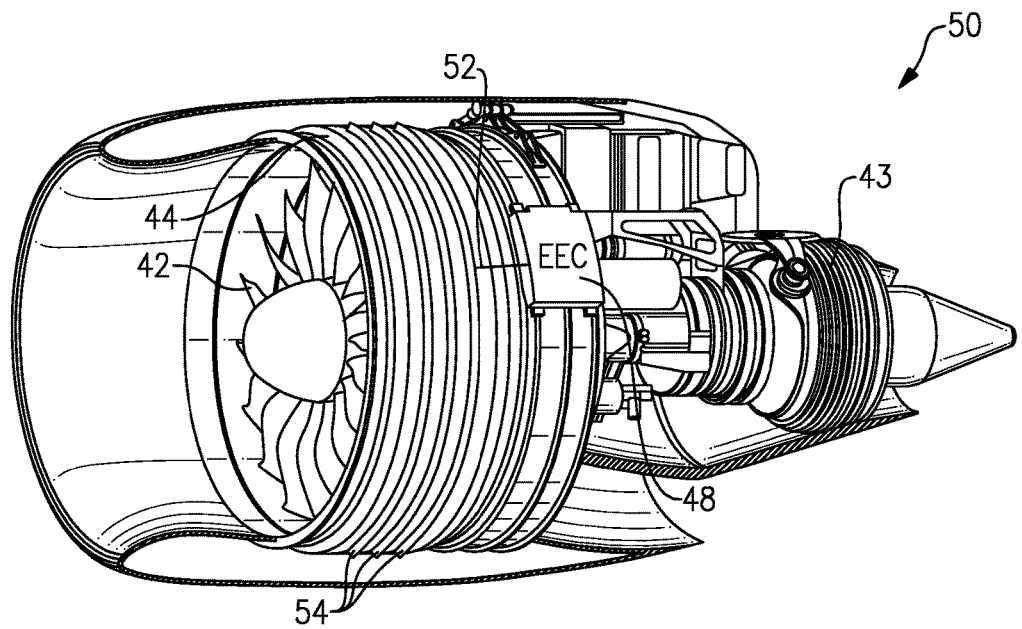
FIG. 3 shows another embodiment.

FIG. 3 shows a fan 42 has a fan case 44 in a gas turbine engine 50. Other areas 43 of the engine would be very hot compared to the fan case 44. FIG. 3 further shows an engine embodiment 50, wherein the capacitor array is provided by a plurality of axially spaced capacitors 54. At 52, one is shown providing supplemental power to an EEC 48 for the engine 50. These capacitors may be circumferentially wrapped foils and may be multiple or single layers.

Figure 4:
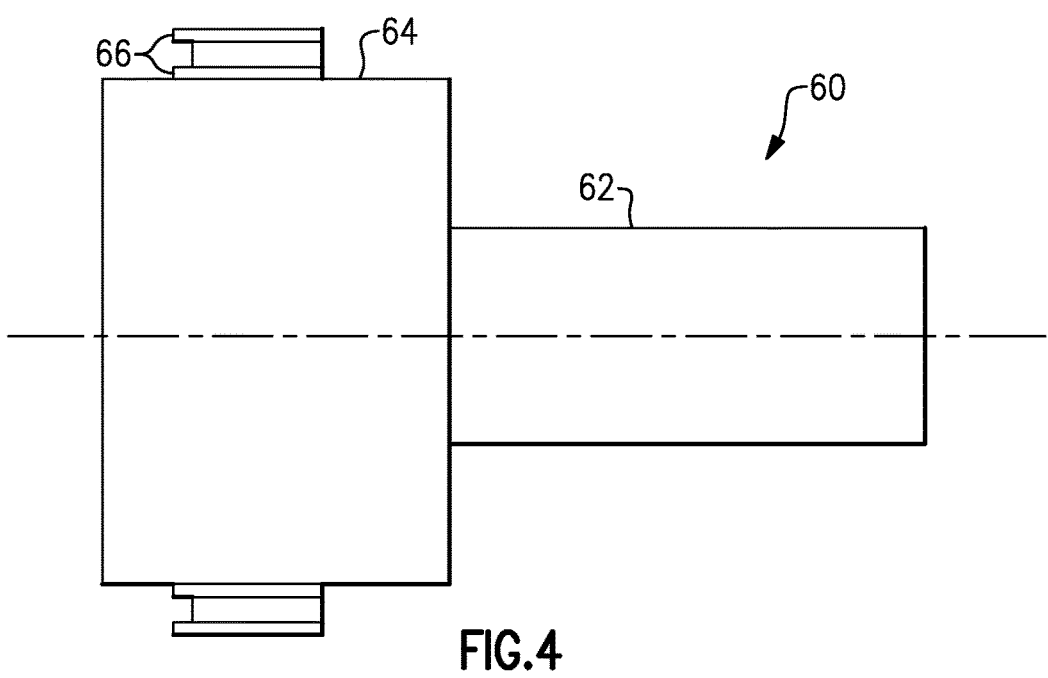
FIG. 4 shows another embodiment.

FIG. 4 shows an engine embodiment 60, wherein the fan case 64 is provided with capacitors 66 and spaced away from hot areas 62 of the engine 60. The capacitors 66 are shown formed in multiple radially spaced layers.

The capacitors in the arrays are actually formed as storage cells, and may have any number of configurations. FIGS. 5A-5D show four possible arrangements.

Figure 5A:
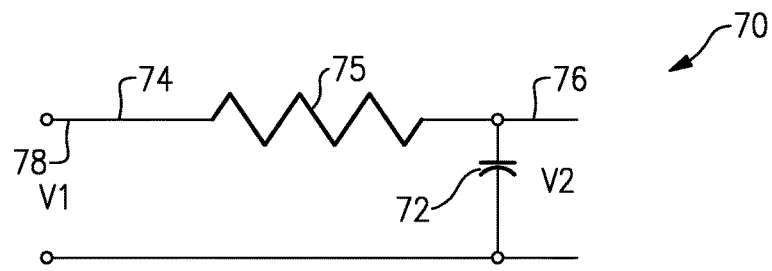
FIG. 5A shows a first capacitor arrangement.

A storage cell 70 illustrated in FIG. 5A includes a capacitor 72 that will receive power from a power supply end 78 along line 74 through a resistor 75. Line 76 leads to a component to be provided with power. Appropriate controls would be utilized to communicate the power from capacitor 72 to a component.

Figure 5B:
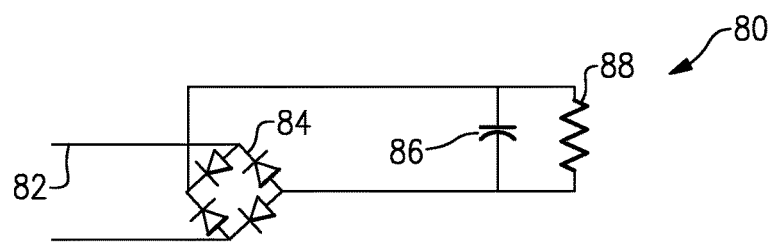
FIG. 5B shows a second capacitor arrangement.

FIG. 5B shows a storage cell 80 having a rectifier 84 which will change a DC input 82 to an AC output stored at another capacitor 86 and across a resistor 88.

Figure 5C:
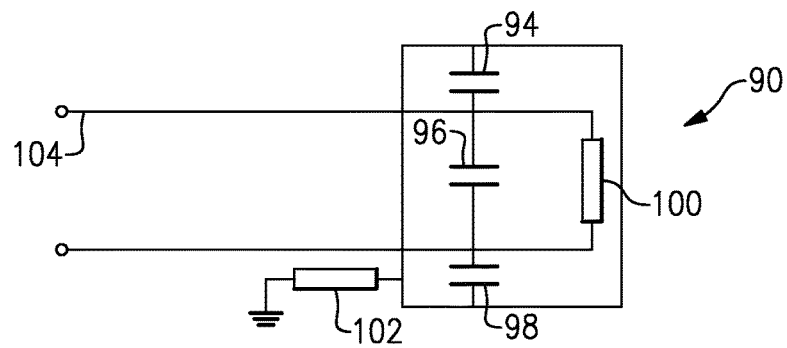
FIG. 5C shows a third capacitor arrangement.

A storage cell 90 is shown in FIG. 5C and receives an input at 104, and includes a plurality of spaced capacitor storage elements 94, 96 and 98. A load resistor 102 may connect the circuit to ground. Element 100 may be a load resistor or may be the component to be powered.

FIG. 5C provides EMI isolation to a main electric grid or power source and prevents back-conducted EMI onto the grid. This can also reduce transient current demand from the grid.

Figure 5D:
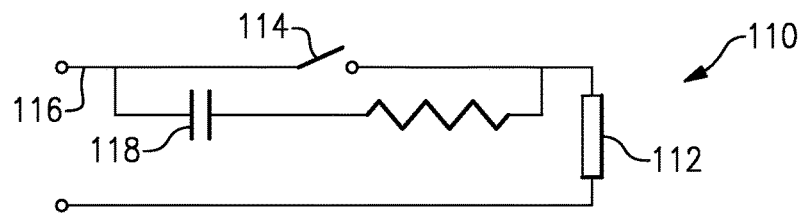
FIG. 5D shows a fourth capacitor arrangement.

FIG. 5D shows a storage embodiment 110, which provides surge control to a component 112 associated with a power switch 114. An input 116 communicates to the component 112 when switch 114 is closed. However, the capacitor 118 is powered and will provide a "snubber" for suppressing arcs across the switch 114.

Of course, the total array may include storage cells of each type.

The plurality of storage cells are isolated and may be provided to have different capacitances and voltage ratings. As mentioned, they may provide transient power and storage for actuators, which accelerate or de-accelerate and demand instantaneous large amounts of power. Further, they may power accessory motors on the engine, such as fuel or oil pumps.

The storage cells may be formed of dielectric or mica based multi-layer wound materials or any number of other assemblies.

Storage cells may also smooth DC pulses after rectification. The stored charges may be delivered to a load when a rectified or pulsating DC voltage decreases below a peak DC voltage signal. In addition, they can provide source and sink for rapid current transients.

Finally, a benefit to wrapping the engine fan case with the capacitive storage cells is that it provides a sound barrier to reduce conducted vibration noise from the fan case to areas outward of the engine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An architecture for providing power to an aircraft comprising:
   a power supply, said power supply for providing power to a plurality of components;
   an array including a plurality of storage cells, said plurality of storage cells including capacitors which are charged by said power supply, and which selectively provide power to said components; and
   said array is mounted on a fan case of a gas turbine engine.

2. The architecture as set forth above in claim 1, wherein said power supply is provided by a generator and a bus for powering systems on the aircraft.

3. The architecture as set forth above in claim 1, wherein at least one of said storage cells provides power across a switch between said power supply and said at least one component, and said storage cell reducing arcs upon closure of said switch.

4. The architecture as set forth above in claim 1, wherein said storage cells are provided with a rectifier.

5. The architecture as set forth above in claim 1, wherein said storage cells provide power to a component at a peak power transient.

6. The architecture as set forth above in claim 1, wherein said plurality of storage cells are circumferentially spaced about said fan case.

7. The architecture as set forth above in claim 1, wherein said plurality of storage cells are axially spaced along a drive axis of said fan.

8. The architecture as set forth above in claim 1, wherein said plurality of storage cells include at least a plurality of radially spaced storage cells.

9. An engine comprising:
   a fan including a fan case;
   a power supply, said power supply for providing power to a plurality of components; and
   a storage cell array mounted on said fan case and including a plurality of storage cells, said plurality of storage cells including capacitors which are charged by said power supply, and which selectively provide power to said components.

10. The engine as set forth above in claim 9, wherein said power supply is provided by at least one of a generator and a bus for powering systems on an associated aircraft.

11. The engine as set forth above in claim 9, wherein at least one of said storage cells provides power across a switch between said power supply and said at least one component, and said storage cell reducing arcs upon closure of said switch.

12. The engine as set forth above in claim 9, wherein, wherein said storage cells are provided with a rectifier.

13. The engine as set forth above in claim 9, wherein said plurality of storage cells are circumferentially spaced about said fan case.

14. The engine as set forth above in claim 9, wherein said plurality of storage cells are axially spaced along a drive axis of said fan.

15. The engine as set forth above in claim 9, wherein said plurality of storage cells include at least a plurality of radially spaced storage cells.

* * * * *